US012596044B2

(12) United States Patent
Fu et al.

(10) Patent No.: US 12,596,044 B2
(45) Date of Patent: Apr. 7, 2026

(54) PRESSURE SENSOR HAVING AN ELASTIC CONDUCTIVE MEMBER

(71) Applicant: Measurement Specialties (China) Ltd., Shenzhen City (CN)

(72) Inventors: Tinghui (Felix) Fu, Shenzhen (CN); Xu Liang, Shenzhen (CN); Long (Allen) Wang, Shenzhen (CN)

(73) Assignee: Measurement Specialties (China) Ltd., Shenzhen City (CN)

( * ) Notice: Subject to any disclaimer, the term of this patent is extended or adjusted under 35 U.S.C. 154(b) by 332 days.

(21) Appl. No.: 18/352,307

(22) Filed: Jul. 14, 2023

(65) Prior Publication Data

US 2024/0019330 A1     Jan. 18, 2024

(30) Foreign Application Priority Data

Jul. 15, 2022    (CN) .......................... 202210836740.3

(51) Int. Cl.
*G01L 19/00*        (2006.01)
*G01L 19/04*        (2006.01)
*G01L 19/14*        (2006.01)

(52) U.S. Cl.
CPC ........ *G01L 19/147* (2013.01); *G01L 19/0038* (2013.01); *G01L 19/0069* (2013.01); *G01L 19/0084* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12;
(Continued)

(56) References Cited

U.S. PATENT DOCUMENTS 10,151,658 B2 * 12/2018 Ching, Jr. ............... H01L 24/49
11,254,561 B2 * 2/2022 Duqi ......................... G01L 1/26
(Continued)

FOREIGN PATENT DOCUMENTS

CN        110174210 A  *  8/2019  ............... G01L 9/12
CN        215296319 U  *  12/2021
(Continued)

*Primary Examiner* — Andre J Allen
(74) *Attorney, Agent, or Firm* — Barley Snyder

(57)        ABSTRACT

A pressure sensor includes a shell having an installation chamber and an inner cavity for accommodating a fluid, a pressure detection chip installed in the installation chamber of the shell for detecting a fluid pressure in the inner cavity, a circuit board installed in the installation chamber of the shell and electrically connected to the pressure detection chip, a cover installed in an opening of the installation chamber of the shell to seal the opening of the installation chamber, and a terminal passing through the cover and fixed to the cover. The circuit board has a conductive hole and the pressure sensor has an elastic conductive member arranged in the conductive hole. The elastic conductive member is in electrical contact with the terminal to electrically connect the terminal to the conductive hole.

21 Claims, 7 Drawing Sheets

(58) Field of Classification Search

CPC ... G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................... 73/700–756

See application file for complete search history.

(56) References Cited

U.S. PATENT DOCUMENTS

| | | | | |
|---|---|---|---|---|
| 11,624,671 | B2 * | 4/2023 | Takimoto | G01L 19/0046 |
| | | | | 73/756 |
| 12,320,719 | B2 * | 6/2025 | Fu | G01L 13/026 |
| 2023/0366765 | A1 * | 11/2023 | Fu | G01L 19/14 |

FOREIGN PATENT DOCUMENTS

| | | | | | |
|---|---|---|---|---|---|
| CN | 119124439 | A | * | 12/2024 | G01L 19/142 |
| CN | 119469483 | A | * | 2/2025 | G01L 1/16 |
| DE | 102020215154 | A1 | * | 6/2021 | G01L 19/069 |
| KR | 102818957 | B1 | * | 6/2025 | G01L 9/0041 |

* cited by examiner

PRESSURE SENSOR HAVING AN ELASTIC CONDUCTIVE MEMBER

CROSS-REFERENCE TO RELATED APPLICATIONS

This application claims the benefit of the filing date under 35 U.S.C. § 119(a)-(d) of Chinese Patent Application No. 202210836740.3, filed on Jul. 15, 2022.

FIELD OF THE INVENTION

The present invention relates to a pressure sensor.

BACKGROUND

In the prior art, a pressure sensor typically includes a shell, a circuit board, a pressure detection chip, a cover, and a plurality of terminals. The circuit board and the pressure detection chip are installed in the installation chamber of the shell. The cover is installed in the opening of the installation chamber. The terminals pass through the cover and are secured to the cover. One end of the terminal is in direct electrical contact with a conductive hole or slot on the circuit board. However, this type of electrical contact method has a low contact force and cannot guarantee reliable electrical contact. Moreover, the contact resistance is high, which reduces the signal transmission performance of the sensor.

SUMMARY

A pressure sensor includes a shell having an installation chamber and an inner cavity for accommodating a fluid, a pressure detection chip installed in the installation chamber of the shell for detecting a fluid pressure in the inner cavity, a circuit board installed in the installation chamber of the shell and electrically connected to the pressure detection chip, a cover installed in an opening of the installation chamber of the shell to seal the opening of the installation chamber, and a terminal passing through the cover and fixed to the cover. The circuit board has a conductive hole and the pressure sensor has an elastic conductive member arranged in the conductive hole. The elastic conductive member is in electrical contact with the terminal to electrically connect the terminal to the conductive hole.

BRIEF DESCRIPTION OF THE DRAWINGS

The invention will be described in more detail in the following with reference to exemplary embodiments illustrated in the drawings, in which.

DETAILED DESCRIPTION OF THE EMBODIMENT(S)

Figure 1:
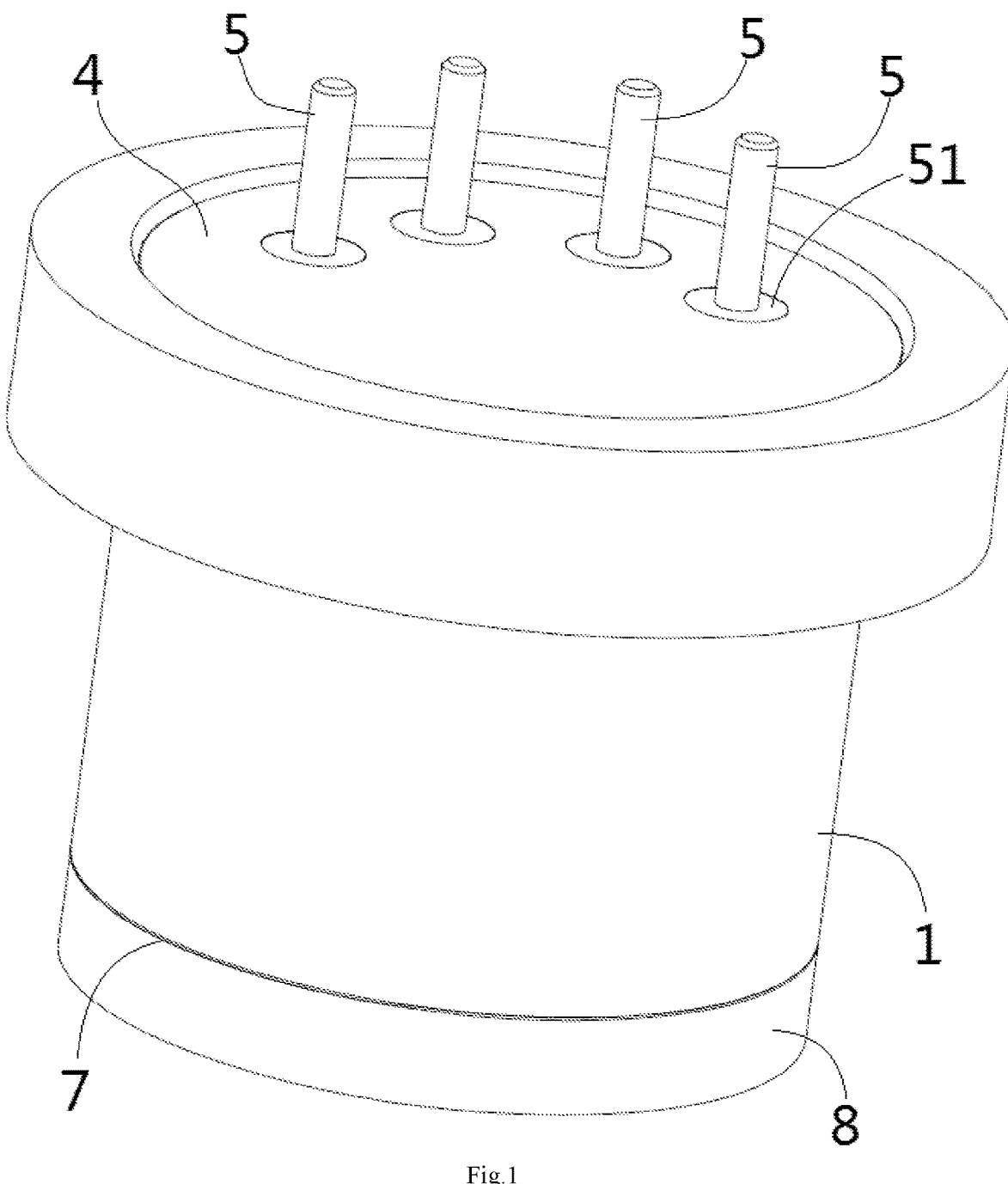
FIG. 1 is a perspective view of a pressure sensor according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
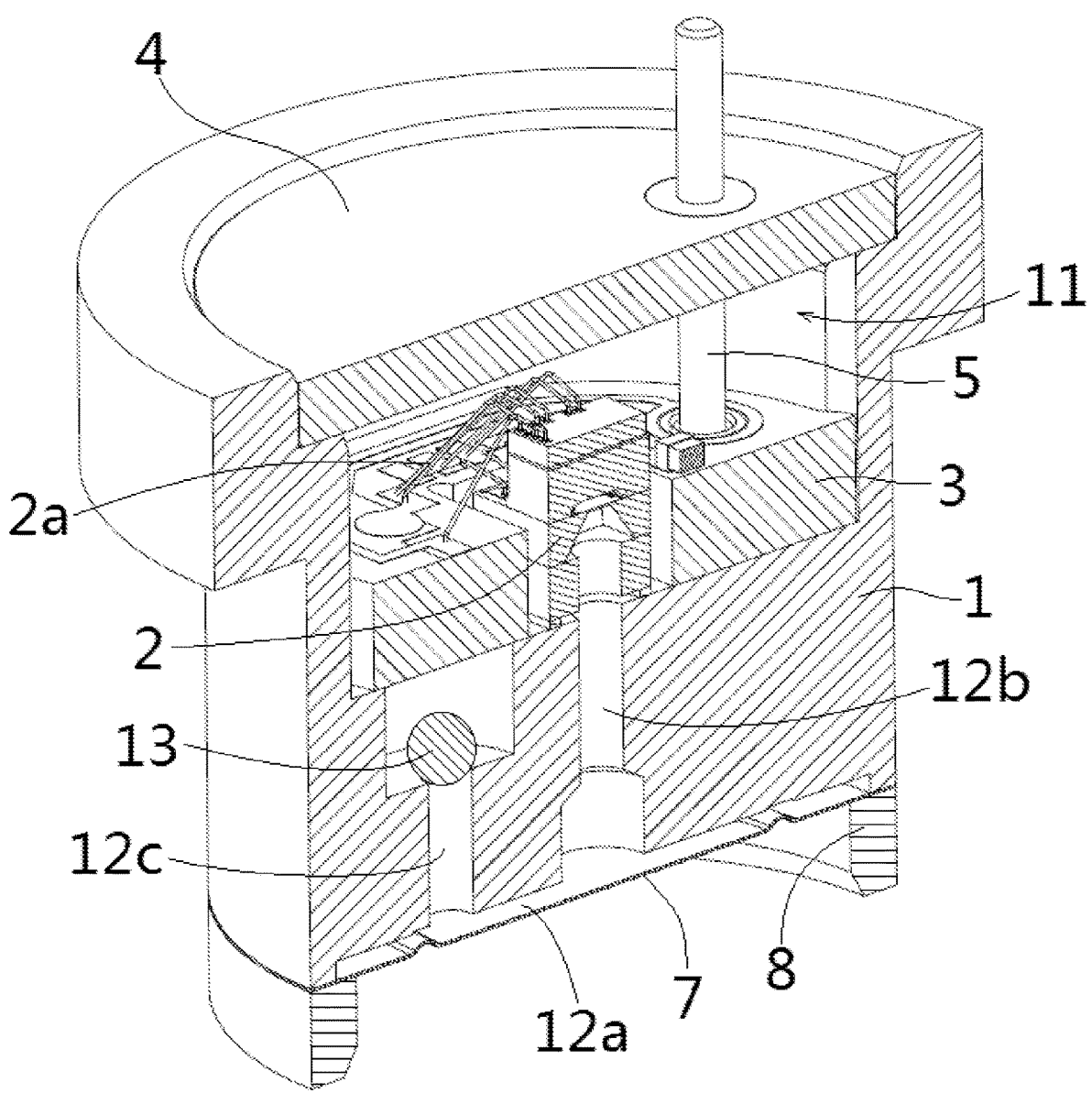
FIG. 2 is a sectional perspective view of a pressure sensor according to an exemplary embodiment of the present invention, in which an inner cavity for accommodating fluid is shown.
Figure 3:
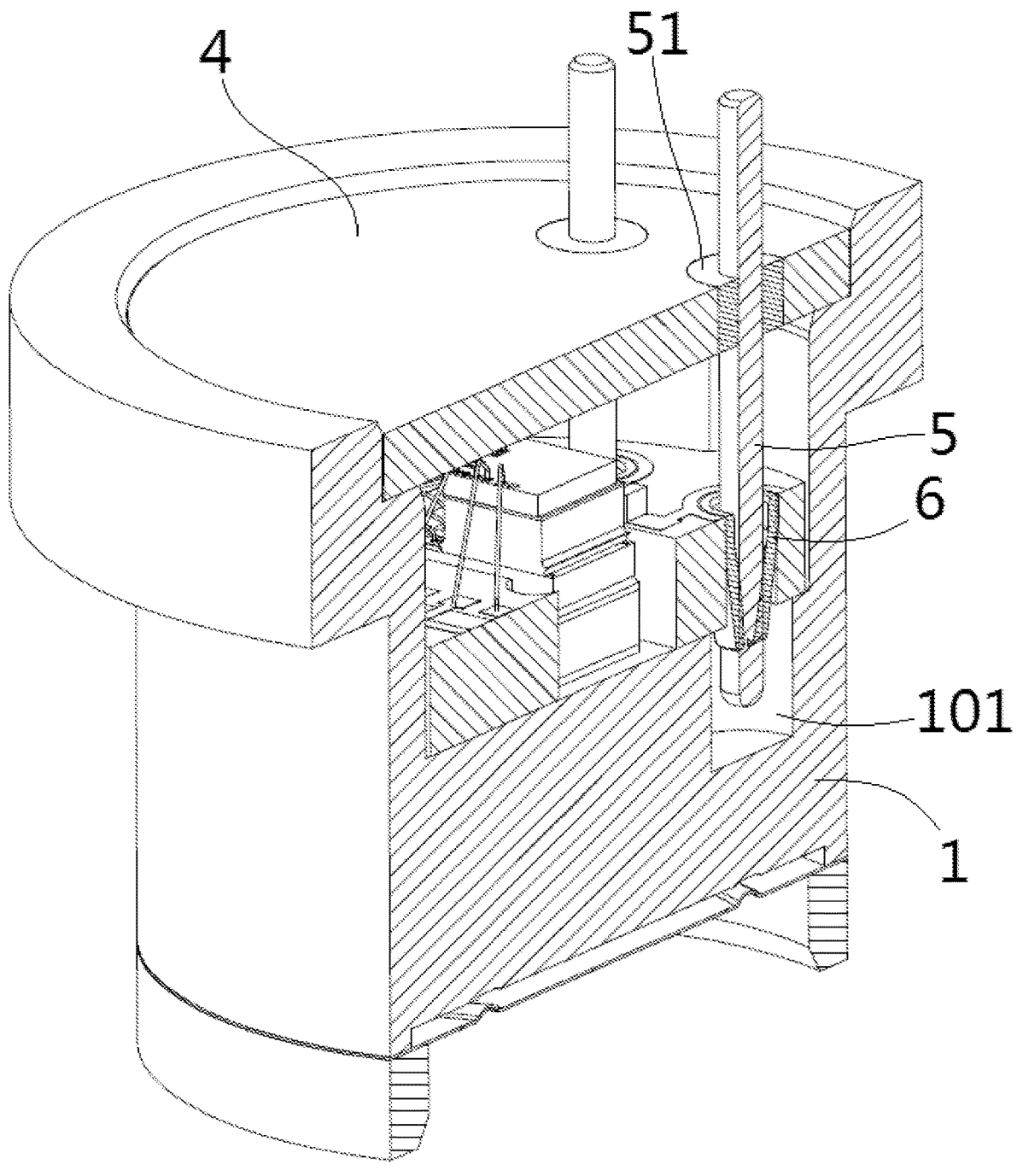
FIG. 3 is a sectional perspective view of a pressure sensor according to an exemplary embodiment of the present invention, in which an elastic clip for clamping a terminal is shown.

FIG. 1 shows an illustrative perspective view of a pressure sensor according to an exemplary embodiment of the present invention. FIG. 2 shows an axial cross-sectional view of a pressure sensor according to an exemplary embodiment of the present invention, in which a cavity 12a, 12b, 12c for accommodating fluid is shown. FIG. 3 shows another axial cross-sectional view of a pressure sensor according to an exemplary embodiment of the present invention, in which an elastic clip 6 for clamping terminal 5 is shown.

As shown in FIGS. 1 to 3, in an exemplary embodiment of the present invention, a pressure sensor is disclosed. The pressure sensor includes: a shell 1, a pressure detection chip 2, a circuit board 3, a cover 4, and terminals 5. The shell 1 is formed with an installation chamber 11 and an inner cavity 12a, 12b, and 12c for accommodating fluid. The pressure detection chip 2 is fixedly installed in the installation chamber 11 of the shell 1, used to detect fluid pressure in the inner cavity 12a, 12b, and 12c. The circuit board 3 is fixedly installed in the installation chamber 11 of the shell 1 and electrically connected to the pressure detection chip 2. Cover 4 is installed in an opening of installation chamber 11 of shell 1 to seal the opening of installation chamber 11. Terminal 5 passes through the cover 4 and is secured to the cover 4.

Figure 5:
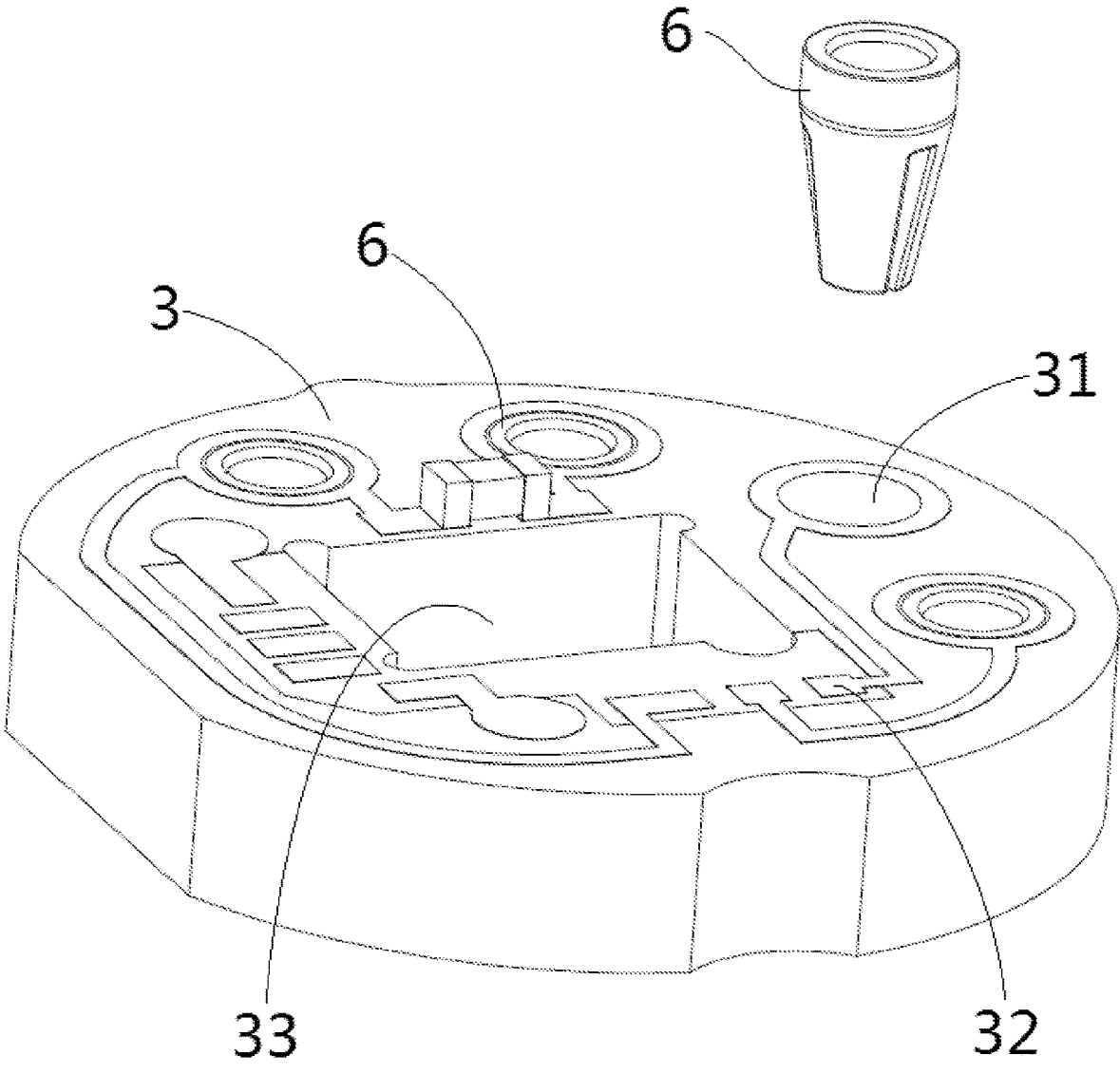
FIG. 5 is a perspective view of a circuit board and an elastic clip of a pressure sensor according to an exemplary embodiment of the present invention.

As shown in FIG. 5, a conductive hole 31 is formed on the circuit board 3, and the pressure sensor also includes an elastic conductive member 6 arranged in the conductive hole 31. The elastic conductive member 6 is in elastic electrical contact with the terminal 5 to electrically connect the terminal 5 to the conductive hole 31. The elastic conductive member 6 provides sufficient elastic electrical contact force to ensure reliable electrical connection of the terminal 5 to the circuit board 3, thereby improving the signal transmission performance of the pressure sensor.

Figure 4:
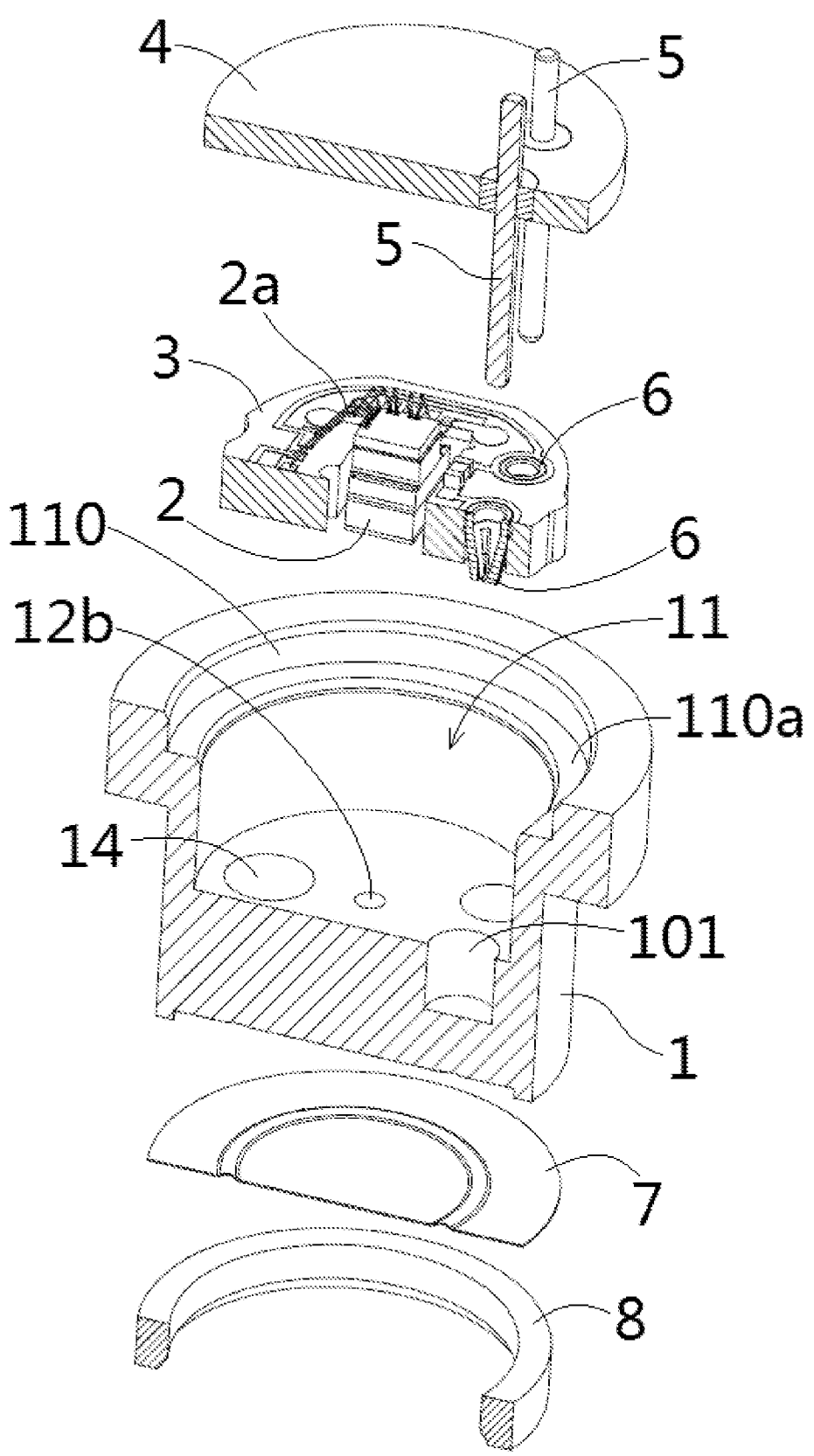
FIG. 4 is an exploded sectional perspective view of a pressure sensor according to an exemplary embodiment of the present invention.
Figure 6:
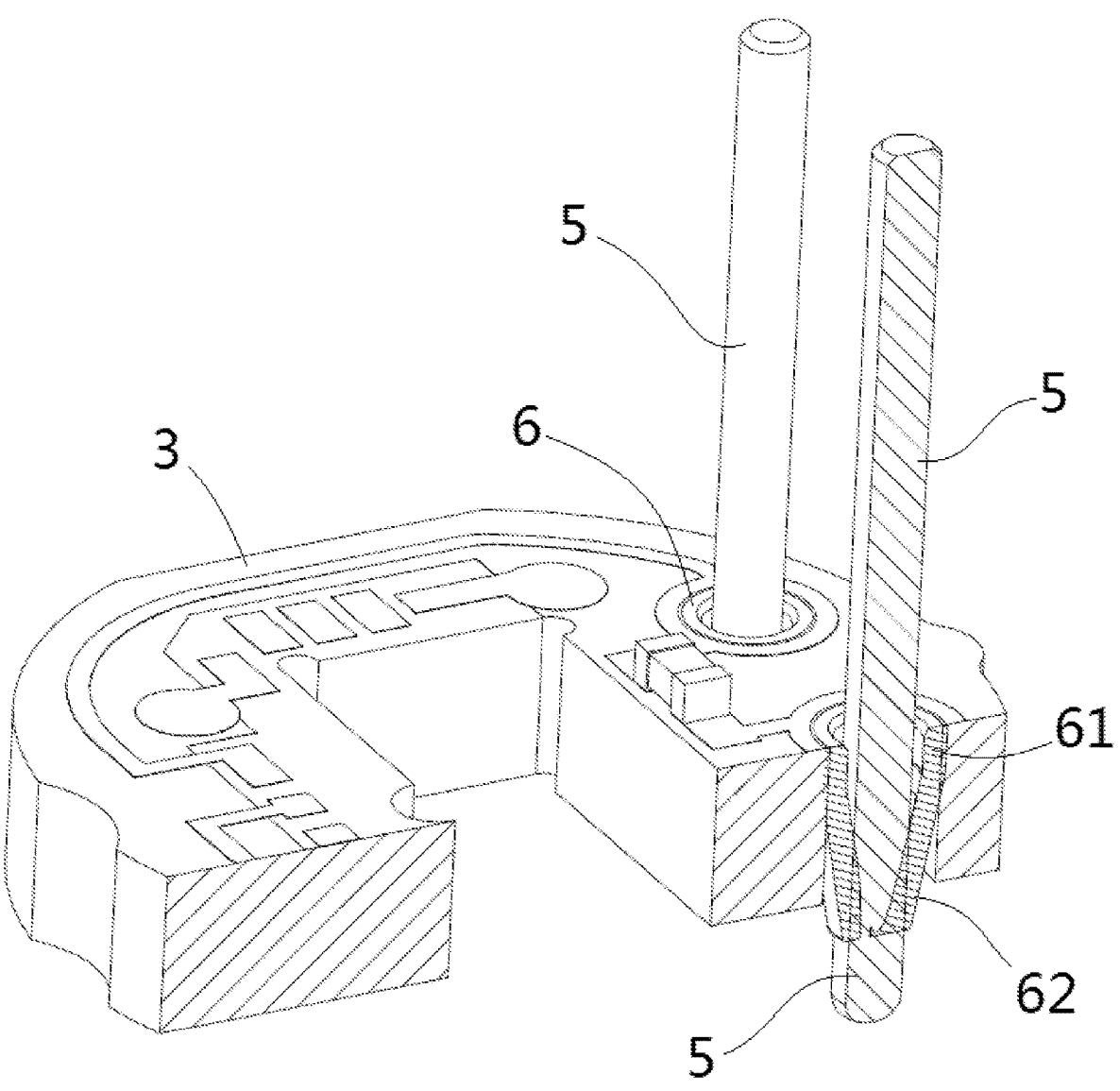
FIG. 6 is a sectional perspective view of a circuit board, an elastic clip, and a terminal of a pressure sensor according to an exemplary embodiment of the present invention.
Figure 7:
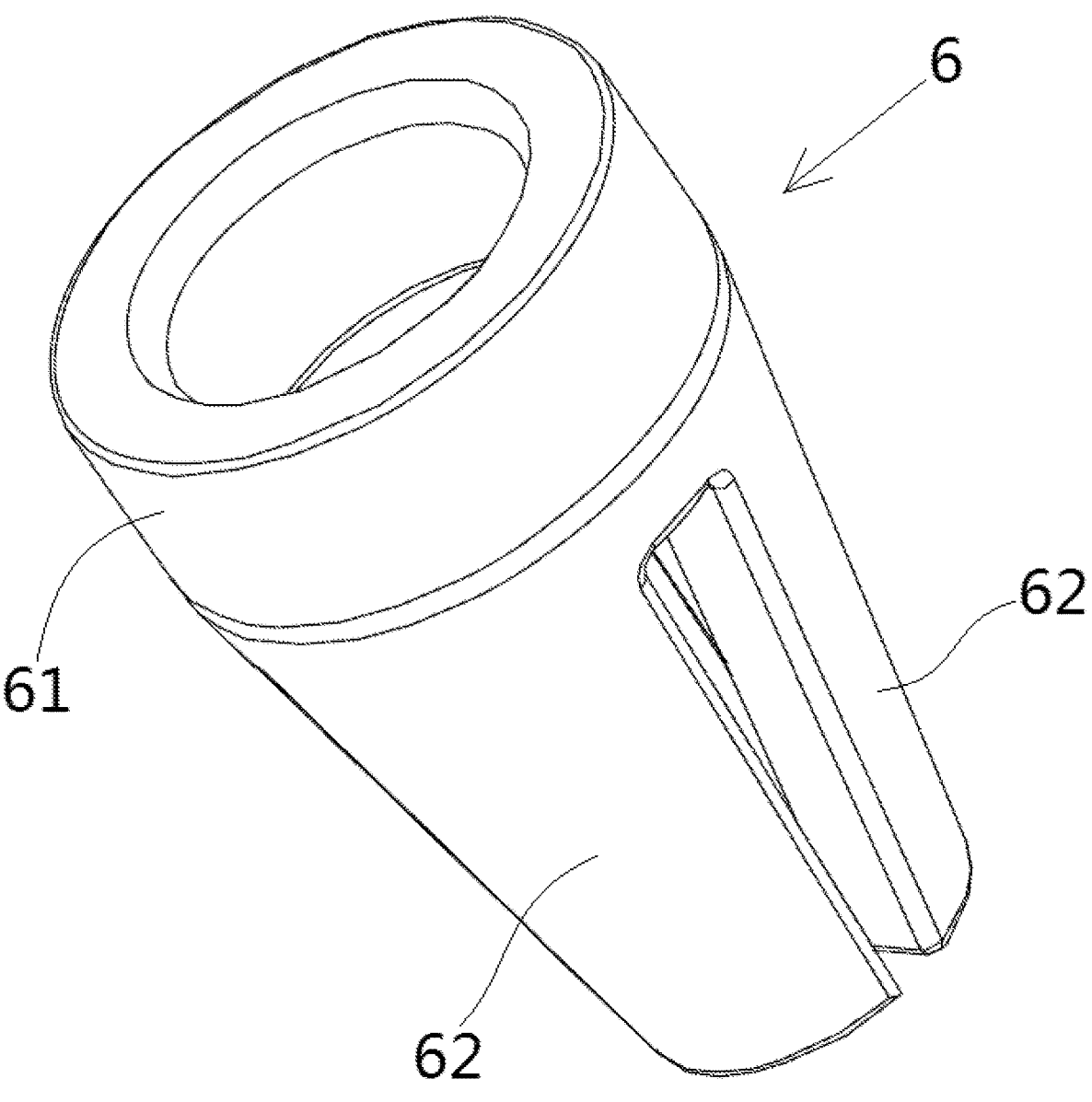
FIG. 7 is a perspective view of an elastic clip of a pressure sensor according to an exemplary embodiment of the present invention.

FIG. 4 shows an illustrative exploded view of a pressure sensor according to an exemplary embodiment of the present invention. FIG. 5 shows an illustrative perspective view of the circuit board 3 and elastic clip 6 of a pressure sensor according to an exemplary embodiment of the present invention. FIG. 6 shows a cross-sectional view of the circuit board 3, elastic clip 6, and terminal 5 of a pressure sensor according to an exemplary embodiment of the present invention. FIG. 7 shows an illustrative perspective view of the elastic clip 6 of a pressure sensor according to an exemplary embodiment of the present invention.

The conductive hole 31 is a conductive through hole 31 that runs through the circuit board 3 in the thickness direction of the circuit board 3. The elastic conductive member 6 is an elastic clip 6, which is installed in the conductive through hole 31. Terminal 5 is inserted into the elastic clip 6, as shown in FIG. 6, and the elastic clip 6 clamps the terminal 5. The terminal 5 is generally cylindrical, and one end of terminal 5 passes through the elastic clip 6 and the conductive through hole 31 axially.

As shown in FIGS. 6 and 7, the elastic clip 6 includes a cylindrical base 61 and a plurality of elastic claws 62. The cylindrical base 61 is embedded in the conductive through hole 31. The plurality of elastic claws 62 are connected to one side of the cylindrical base 61 and distributed at intervals in the circumferential direction of the cylindrical base 61. The plurality of elastic claws 62 hold and clamp the terminal 5 to achieve electrical connection between the two.

As shown in FIG. 3, a blind hole 101 is formed in the bottom surface of the installation chamber 11 of the shell 1. One end of terminal 5 and an end of elastic claw 62 extend into the blind hole 101.

The pressure sensor includes a plurality of terminals 5 and a plurality of elastic conductive members 6, and a plurality of conductive holes 31 are formed on the circuit board 3. The plurality of elastic conductive members 6 are respectively arranged in the plurality of conductive holes 31 and are in elastic electrical contact with the plurality of terminals 5 to electrically connect the plurality of terminals 5 to the plurality of conductive holes 31, respectively.

As shown in FIG. 2, the pressure detection chip 2 and the circuit board 3 are both bonded to the bottom surface inside the installation chamber 11 of the shell 1. A receiving hole 33 is formed on the circuit board 3 to accommodate the pressure detection chip 2, as shown in FIG. 5, and the pressure detection chip 2 is accommodated in the receiving hole 33 of the circuit board 3. The pressure detection chip 2 is electrically connected to the circuit board 3 through wire 2a and is electrically connected to the conductive hole 31 through a conductive trace on the circuit board 3. A welding pad 32 is formed on the circuit board 3, as shown in FIG. 5, with one end of wire 2a welded to the pressure detection chip 2 and the other end welded to the welding pad 32.

The inner cavity 12a, 12b, and 12c of the shell 1, as shown in FIG. 2, includes a fluid containment chamber 12a and a first fluid path 12b. The first fluid path 12b is communicated with the fluid containment chamber 12a and has an outlet located on the bottom surface of the installation chamber 11. The pressure detection chip 2 seals the outlet of the first fluid path 12b and contacts the fluid in the inner cavity 12a, 12b, and 12c through the outlet of the first fluid path 12b to detect the fluid pressure in the inner cavity 12a, 12b, and 12c.

The pressure sensor further includes a diaphragm 7, shown in FIG. 2, which is attached to the shell 1 and seals the opening of the fluid containment chamber 12a, for transmitting external medium pressure to the fluid in the inner cavity 12a, 12b, and 12c.

The pressure sensor further includes a welding ring 8 as shown in FIG. 2. The welding ring 8 is arranged on the outer side of the diaphragm 7 and the periphery part of the diaphragm 7 is welded to the end face of the shell 1 by the welding ring 8.

As shown in FIG. 2, the inner cavities 12a, 12b, and 12c of the shell 1 also includes a second fluid path 12c. The second fluid path 12c is communicated with the fluid containment chamber 12a and has a fluid filling port for filling fluid into the inner cavity 12a, 12b, and 12c. The pressure sensor also includes a sealing element 13, which is attached to the shell 1 and seals the fluid filling port of the second fluid path 12c.

An accommodating recess 14 is formed on the bottom surface of the installation chamber 11 of the shell 1, as shown in FIG. 4. The fluid filling port of the second fluid path 12c is located on the bottom surface of the accommodating recess 14, and the sealing element 13 is accommodated in the accommodating recess 14 to prevent interference between the sealing element 13 and the circuit board 3. In the illustrated embodiment, the sealing member 13 is a sphere and welded to the fluid filling port of the second fluid path 12c.

As shown in FIG. 2, the shell 1 has a first end and a second end axially opposite to the first end, the installation chamber 11 is located at the first end of the shell 10, and the fluid containment chamber 12a is located at the second end of the shell 10.

A diameter of the opening part 110 of the installation chamber 11, as shown in FIG. 4, is greater than the diameter of rest part of the installation chamber 11 except for the opening part 110, thereby a positioning step 110a is formed in the installation chamber 11. The cover 4 is accommodated in the opening part 110 of the installation chamber 11 and supported on the positioning step 110a, as shown in FIGS. 1-3.

In an embodiment, the cover 4 is welded to the inner wall surface of the installation chamber 11, and a through hole is formed in the cover 4 that allows terminal 5 to pass through. There is a sealing ring 51 installed on terminal 5, as shown in FIG. 1, which is inserted into the through hole of the cover 4 to achieve sealing between terminal 5 and cover 4.

In the illustrated embodiments, the pressure sensor is an oil filled pressure sensor, and the fluid filled in the inner cavity 12a, 12b, and 12c of the shell 1 is insulation oil.

The present invention is not limited to the illustrated embodiments. For example, in another exemplary embodiment of the present invention, the conductive hole 31 may be a conductive blind hole that does not penetrate the circuit board 3 in the thickness direction of the circuit board 3. The elastic conductive member 6 can be a spiral spring, with one end of the spiral spring accommodated in the conductive blind hole and the other end in elastic electrical contact with the terminal. At this point, terminal 5 can include a cylindrical body and a disc shaped end. The cylindrical body passes through and is fixed to the cover 4. The disc shaped end of terminal 5 is connected to one end of the cylindrical body. The diameter of the disc shaped end of terminal 5 is greater than the diameter of the cylindrical body, and the surface of the disc shaped end of terminal 5 is in electrical contact with the spiral spring. One end of the spiral spring is supported on the bottom wall of the conductive blind hole and welded to the bottom wall of the conductive blind hole to achieve mechanical and electrical connection between the two.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A pressure sensor, comprising:
a shell having an installation chamber and an inner cavity for accommodating a fluid;
a pressure detection chip installed in the installation chamber of the shell for detecting a fluid pressure in the inner cavity;
a circuit board installed in the installation chamber of the shell and electrically connected to the pressure detection chip;
a cover installed in an opening of the installation chamber of the shell to seal the opening of the installation chamber; and
a terminal passing through the cover and fixed to the cover, the circuit board has a conductive hole and the pressure sensor has an elastic conductive member arranged in the conductive hole, the elastic conductive member is in electrical contact with the terminal to electrically connect the terminal to the conductive hole.

2. The pressure sensor according to claim 1, wherein the conductive hole is a conductive through hole that runs through the circuit board in a thickness direction of the circuit board, the elastic conductive member is an elastic clip installed in the conductive through hole, and the terminal is inserted into the elastic clip and is clamped by the elastic clip.

3. The pressure sensor according to claim 2, wherein the elastic clip includes a cylindrical base embedded in the conductive through hole and a plurality of elastic claws connected to one side of the cylindrical base and distributed at intervals in a circumferential direction of the cylindrical base, the plurality of elastic claws clamp the terminal and electrically connect the elastic clip to the terminal.

4. The pressure sensor according to claim 3, wherein the terminal is generally cylindrical, an end of the terminal passes axially through the elastic clip and the conductive through hole.

5. The pressure sensor according to claim 3, wherein a blind hole is formed on the bottom surface of an installation chamber of the shell, an end of the terminal and an end of the elastic claws extend into the blind hole.

6. The pressure sensor according to claim 1, wherein the conductive hole is a conductive blind hole that does not penetrate the circuit board in a thickness direction of the circuit board, the elastic conductive member is a spiral spring, an end of the spiral spring is accommodated in the conductive blind hole and another end of the spiral spring is in electrical contact with the terminal.

7. The pressure sensor according to claim 6, wherein the end of the spiral spring is supported on a bottom wall of the conductive blind hole and welded to the bottom wall.

8. The pressure sensor according to claim 1, wherein the terminal is one of a plurality of terminals, the elastic conductive member is one of a plurality of elastic conductive members, and the conductive hole is one of a plurality of conductive holes on the circuit board, the plurality of elastic conductive members are respectively arranged in the plurality of conductive holes and are in electrical contact with the plurality of terminals to electrically connect the plurality of terminals to the plurality of conductive holes.

9. The pressure sensor according to claim 1, wherein the pressure detection chip and the circuit board are both bonded to a bottom surface inside the installation chamber of the shell, a receiving hole is formed on the circuit board to accommodate the pressure detection chip.

10. The pressure sensor according to claim 1, wherein the pressure detection chip is electrically connected to the circuit board through a wire and is electrically connected to the conductive hole through a conductive trace on the circuit board.

11. The pressure sensor according to claim 10, wherein the circuit board has a welding pad, an end of the wire is welded to the pressure detection chip and another end of the wire is welded to the welding pad.

12. The pressure sensor according to claim 1, wherein the inner cavity of the shell has a fluid containment chamber and a first fluid path communicated with the fluid containment chamber, the first fluid path has an outlet on a bottom surface of the installation chamber, the pressure detection chip seals the outlet of the first fluid path and contacts the fluid in the inner cavity through the outlet of the first fluid path to detect fluid pressure in the inner cavity.

13. The pressure sensor according to claim 12, further comprising a diaphragm attached to the shell and sealing an opening of the fluid containment chamber to transmit external medium pressure to the fluid in the inner cavity.

14. The pressure sensor according to claim 13, further comprising a welding ring arranged on an outer side of the diaphragm to weld a periphery of the diaphragm to an end face of the shell.

15. The pressure sensor according to claim 12, wherein the inner cavity of the shell has a second fluid path communicating with the fluid containment chamber and has a fluid filling port for filling the fluid into the inner cavity, the pressure sensor has a sealing element attached to the shell and sealing the fluid filling port of the second fluid path.

16. The pressure sensor according to claim 15, wherein a receiving recess is formed on the bottom surface of the installation chamber of the shell, the fluid filling port of the second fluid path is formed on a bottom surface of the receiving recess, and the sealing element is accommodated in the receiving recess to prevent interference between the sealing element and the circuit board.

17. The pressure sensor according to claim 15, wherein the sealing element is a sphere and is welded to the fluid filling port of the second fluid path.

18. The pressure sensor according to claim 12, wherein the shell has a first end and a second end that are axially opposite, the installation chamber is located at the first end of the shell, and the fluid containment chamber is located at the second end of the shell.

19. The pressure sensor according to claim 1, wherein a diameter of an opening part of the installation chamber is greater than a diameter of a rest of the installation chamber except for the opening part, so that a positioning step is formed in the installation chamber, the cover is accommodated in the opening part and supported on the positioning step.

20. The pressure sensor according to claim 1, wherein the cover is sealed and welded to an inner wall surface of the installation chamber, and a through hole is formed on the cover that allows the terminal to pass through, a sealing ring is sleeved on the terminal, the sealing ring is inserted into the through hole of the cover to achieve sealing between the terminal and the cover.

21. The pressure sensor according to claim 1, wherein the terminal is inserted into the elastic conductive member.

* * * * *